(12) United States Patent
Gumpoltsberger et al.

(10) Patent No.: US 7,056,252 B2
(45) Date of Patent: Jun. 6, 2006

(54) TRANSMISSION FOR DISTRIBUTING A DRIVE TORQUE

(75) Inventors: Gerhard Gumpoltsberger, Friedrichshafen (DE); Detlef Baasch, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 114 days.

(21) Appl. No.: 10/833,609

(22) Filed: Apr. 28, 2004

(65) Prior Publication Data

US 2004/0220011 A1   Nov. 4, 2004

(30) Foreign Application Priority Data

May 2, 2003   (DE) ................ 103 19 684

(51) Int. Cl.
*F16H 48/02*   (2006.01)
(52) U.S. Cl. ................ 475/6; 475/150; 475/221
(58) Field of Classification Search ................ 475/18, 475/21, 29, 221, 249, 6, 150
See application file for complete search history.

(56) References Cited

U.S. PATENT DOCUMENTS

| | | | | |
|---|---|---|---|---|
| 168,955 | A * | 10/1875 | Annin | 475/6 |
| 1,984,830 | A * | 12/1934 | Higley | 475/21 |
| 2,757,513 | A * | 8/1956 | Banker | 475/29 |
| 3,450,218 | A * | 6/1969 | Looker | 475/6 |
| 4,497,218 | A * | 2/1985 | Zaunberger | 475/29 |
| 5,135,071 | A | 8/1992 | Shibahata et al. | |
| 6,053,833 | A * | 4/2000 | Masaki | 475/2 |
| 6,098,737 | A | 8/2000 | Aoki | |
| 6,206,798 | B1 * | 3/2001 | Johnson | 475/6 |
| 6,830,529 | B1 * | 12/2004 | Phelan et al. | 475/221 |
| 2002/0166676 | A1 * | 11/2002 | Andriani | 172/2 |
| 2004/0204278 | A1 * | 10/2004 | Olsson | 475/18 |

FOREIGN PATENT DOCUMENTS

| | | |
|---|---|---|
| DE | 40 00 667 C2 | 9/1992 |
| JP | 2002172946 A | 6/2002 |

* cited by examiner

*Primary Examiner*—Sherry Estremsky
(74) *Attorney, Agent, or Firm*—Davis & Bujold, P.L.L.C.

(57) ABSTRACT

A transmission (1) for distributing a drive torque to at least two output shafts (7, 8) which has at least two planetary gear sets (2, 3) with at least three shafts wherein each shaft (4, 5) of a planetary gear set (2, 3) is connected with one input shaft (6). Besides, each shaft of a planetary gear set (2, 3) constitutes one of the output shafts (7, 8) and at least one other shaft (9 or 10) of a planetary gear set (2 or 3) is operatively connected with one shaft (10 or 9) of one other planetary gear set (3 or 2). A torque of a shaft (9 or 10) dependent on operating state can be supported according to an operating state of the respective other shaft (10 or 9) via an operative connection (11) therewith in a manner such that when a rotational speed difference occurs between the output shafts (7, 8) a torque that changes the rotational speed difference abuts via the operative connection (11) on the planetary gear sets (2, 3).

10 Claims, 9 Drawing Sheets

TRANSMISSION FOR DISTRIBUTING A DRIVE TORQUE

This application claims priority from German Application Serial No. 103 19 684.6 filed May 2, 2003.

FIELD OF THE INVENTION

The invention concerns a transmission for distributing a drive torque to at least two output shafts having at least two planetary gear sets with at least three shafts.

BACKGROUND OF THE INVENTION

In vehicles, it is known in the practice to transmit as needed to the drive wheels via a transmission a drive torque produced by a prime mover. If vehicles such as four-wheel passenger cars or four-wheel driven trucks are designed with several driven axles, the power of the prime mover in the power train of such vehicles has to be distributed to the individual drive axles.

For power distribution so-called differential transmissions are used wherein the longitudinal differentials seen in driving direction are used for longitudinal distribution of the input of the prime mover to several driven axles of a vehicle. So-called transverse differentials or differential gear units are used in relation to the travel direction of a vehicle for a transverse distribution of the input to drive wheels of a vehicle axle.

The designs of differential transmissions conventionally used in the practice are so-called bevel gear differentials, spur gear differentials in planetary construction or also worm gear differentials. Spur gear differentials are mostly used as longitudinal differentials due to the possibility of asymmetric torque distribution. Meanwhile bevel gear differentials represent a standard for transverse compensation in vehicles and worm gear differentials are used both for longitudinal distribution and for transverse distribution.

With the aid of those distributor transmissions, it is possible to distribute a drive torque in arbitrary ratios to several drive axles without producing stresses in a power train. In addition, it is obtained by using differential transmissions that drive wheels of a drive axle of a vehicle can be driven at different rotational speeds independently of each other according to the different path lengths of the left or right lane whereby the drive torque can be distributed to both drive wheels symmetrically and thus free of yaw torques.

However, opposed to these advantages is the disadvantage that the propulsion forces of two drive wheels of a vehicle axle or of two or more drive axles transmissible to the road, due to the compensating action of a differential transmission, depend on the slight or slightest transmissible drive torque of both drive wheels or of the drive axles. This means, for example, when a drive wheel spins, standing upon smooth ice, the other drive wheel is fed no torque higher than that fed to the spinning drive wheel even when it stands upon soil of good grip. In such a driving situation, the vehicle disadvantageously cannot start off due to the compensating action of a differential transmission which makes a rotational speed difference possible between two output shafts of a differential transmission.

In the practice, it has therefore been changed by adequate means to prevent compensating motion of a differential transmission in the presence of critical driving conditions. This is implemented, for example, by a differential lock known manually or mechanically activatable with mechanical, magnetic, pneumatic or hydraulic means which, by blockage of the differential transmission, locks up to 100% every compensating motion.

Also used are automatically locking differentials, also called differential transmissions with limited slip or locking differentials. Those differential transmissions make it possible to transmit a torque to a wheel of a vehicle axle or to a drive axle even if the other wheel or the other drive axle, in case of several drive axles, skids as a consequence of poor ground adhesion. At the same time, the advantage of the transmission of force free of yaw torque is lost and the free adaptation of the wheel rotational speeds of both drive wheels of a drive axle to the path lengths of the two lanes, likewise, is disadvantageously prevented.

It is further known from the practice to provide externally controlled differential brakes for adjusting a degree of the compensating action of a differential transmission. Those differential brakes constitute mostly electronically regulated and hydraulically actuated systems in which, depending on the existing travel condition, it is possible to a great extent to lock a normally non-locked or only weakly locked differential. An extent of the prevention of the compensating action of a differential transmission is adaptable via a control on the actually existing driving condition.

The previously mentioned solutions, however, have the disadvantage of being characterized by high control and regulation costs and besides require high constructional expenses due to the hydraulic system.

The problem, on which the invention is based, is to make a transmission for distribution of an as needed drive torque available to at least two output shafts, with which a starting off in critical driving situations is ensured and which has a simple and practical design, the same as being characterized by low control and regulation expenses.

SUMMARY OF THE INVENTION

With the inventive transmission for distributing a drive torque to at least two output shafts having at least two planetary gear sets with at least three shafts, a starting off is ensured, even in critical driving situations like on slippery soil, with simple constructional means and at low technical control and regulation expenses.

This is achieved by the fact that when a rotational speed difference exists between two operatively interconnected shafts of the planetary gear sets, one torque that reduces the rotational speed difference between two output shafts of the planetary gear sets abuts on the planetary gear sets.

If the inventive transmission is used as differential transmission for transverse distribution of a drive torque to the two drive wheels of a drive vehicle axle, the two drive wheels are each connected with one output shaft of a planetary gear set. This results in a spinning of a drive wheel, which moves along with a rotational speed difference between both output shafts, and is counteracted in the sense that the spinning output shaft is braked via the operative connection between the two operatively interconnected shafts and the other drive wheel is loaded via the second output shaft of the transmission at least with part of the drive torque whereby a starting off of the vehicle is advantageously made possible.

BRIEF DESCRIPTION OF THE DRAWINGS

The invention will now be described, by way of example, with reference to the accompanying drawings in which.

DETAILED DESCRIPTION OF THE INVENTION

Figure 1:
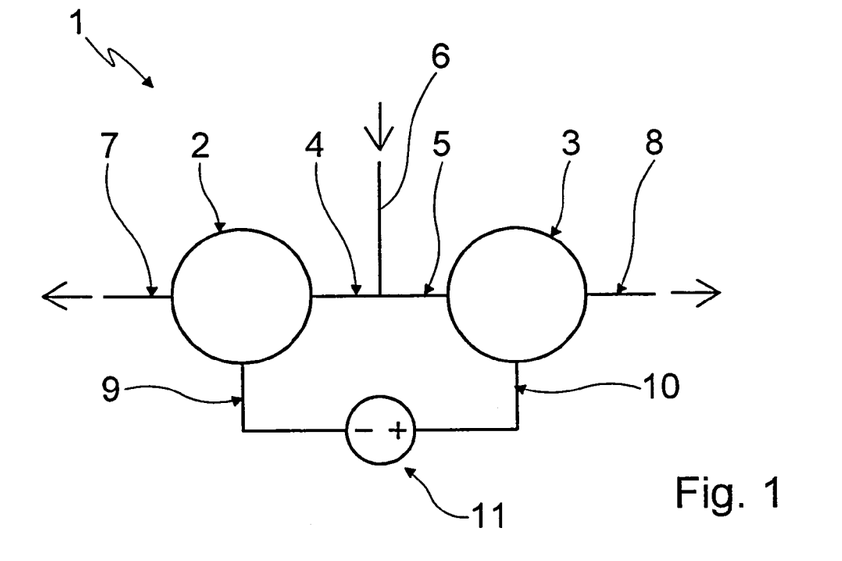
FIG. 1 is a basic diagram of the inventive transmission.

Referring to FIG. 1, it shows a basic diagram of a transmission 1 shows which can preferably be used in a vehicle as differential transmission for longitudinal distribution of a drive torque of a prime mover or for transverse distribution of a drive torque of a prime mover. With the transmission 1, it is easily possible to distribute the drive torque in a longitudinal direction as needed, that is, seen in travel direction of a vehicle, to two driven axles of a vehicle. In addition, the drive torque can be transversely distributed via the transmission 1 to the drive wheels of a driving vehicle axle of a vehicle.

The transmission 1 is designed with two planetary gear sets 2, 3 which, depending on the momentary application, can be designed as negative, positive, bevel gear or stepped planetary gear set. Each shaft 4, 5 of the two planetary gear sets 2, 3 is connected with an input shaft 6. Other shafts 7 and 8 of the planetary gear sets 2, 3 constitute each one output shaft of the transmission 1. A third shaft 9 of the planetary gear set 2 and a third shaft 10 of the planetary gear set 3 are interconnected via an operative connection 11.

The operative connection 11 is designed so that a torque dependent on operation state of the third shaft 9 of the planetary gear set 2 or the third shaft 10 of the planetary gear set 3, according to an operating state of the third shaft 10 of the planetary gearset 3 or of the third shaft 9 of the planetary gear set 2, can be supported in a manner such that if a rotational speed difference occurs between the output shafts 7, 8, via the operative connection 11, a torque that reduces the torque difference abuts on the planetary gear sets 2 and 3 or on the third shafts 9 and 10 of the planetary gear sets 2 and 3.

The operative connection 11 can be made alternatively here to or in combination with a rotational speed inversion between the two operatively interconnected shafts 9 and 10, the same as alternatively or in combination with a torque source for increasing or reducing a torque on at least one of the two operatively interconnected shafts 9 and 10.

Figure 2:
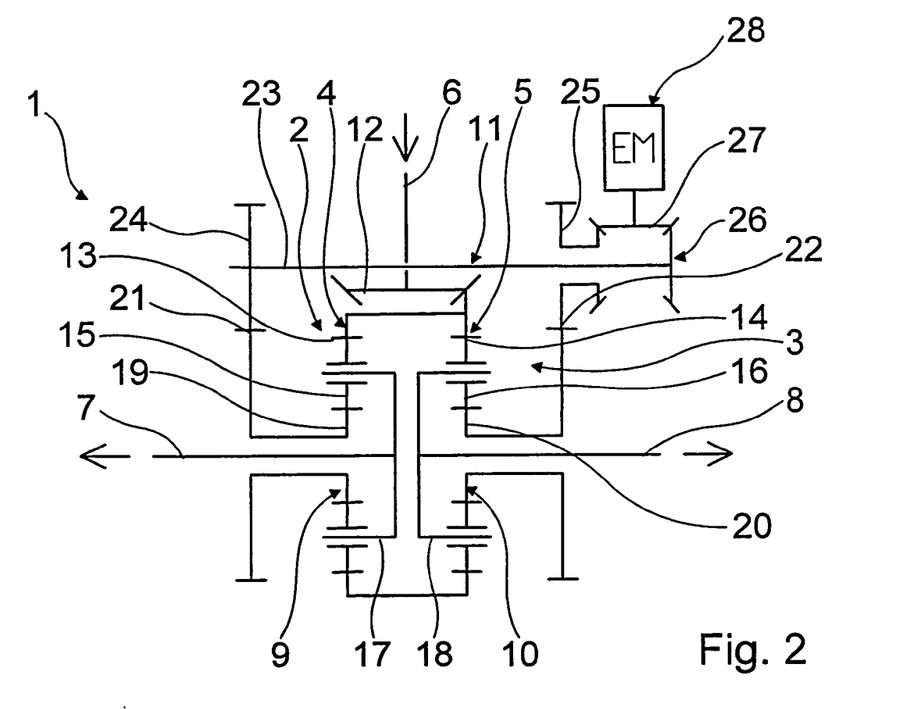
FIG. 2 is a gear diagram of an inventive transmission designed with ratio increase and bevel gear inversion and having one electric motor as torque source.

FIG. 2 shows a gear diagram of a first embodiment of the basic diagram of the inventive transmission 1 shown in FIG. 1. The drive torque of the input shaft 6 is transmitted via a first bevel gear 12 to two operatively interconnected ring gears 13, 14 of the planetary gear sets 2 and 3. From there the drive torque of the input shaft 6 is transmitted to two planetary gears 15 and 16 which are engaged with the two ring gears 13 and 14 and are each rotatably supported upon respective webs 17 and 18, driving both webs 17 and 18 to the ring gears 13 and 14 due to their rolling motion. Both webs 17 and 18 of the planetary gear sets 2 and 3 are, in turn, connected with the two output shafts 7 and 8 so that the drive torque transmitted, via the first bevel gear 12, the two ring gears 13 and 14, the planetary gears 15 and 16 and the webs 17 and 18 reaches both output shafts 7 and 8.

In addition, the planetary gears 15 and 16 mesh each with one sun gear 19 and 20 each of which is designed with a spur gear toothing 21 and 22, respectively. Both spur gear toothings 21 and 22 of the sun gears 19 and 20 mesh with two spur gears 24 and 25, the spur gear 24 being non-rotatably connected with a countershaft 23 and the spur gear 25, which meshes with the spur gear toothing 22 of the sun gear 20 of the planetary gear set 3 communicating via a bevel gear differential 26 with the countershaft 23.

This means that the operative connection 11, shown in FIG. 1, is designed in FIG. 2 with the spur gear steps between the sun gears 19 and 20, the countershaft 22, the same as the bevel gear differential 26 and one device 28 for applying torque to one of the operatively interconnected shafts 9, 10. The device or torque source 28 is designed with a bevel gear 27 of the bevel gear differential 26 and here as an electric motor.

The arrangement of the operative connection 11 with the torque source 28 offers the possibility, depending on the operating state and according to the direction of rotation of the electric motor, of applying a torque to the operatively interconnected sun gears 19 and 20 so that in case of rotational speed difference between the two output shafts 7 and 8, for example, it is possible to reduce or strengthen the compensating action of the transmission 1 between the two output shafts 7 and 8. This means that, via the torque source 28, it is possible to carry out a purposeful torque increase or torque reduction on both operatively interconnected sun gears or shafts 19 and 20 of the planetary gear sets 2 and 3 in order to effectively and easily counteract, for example, an oversteering or understeering while cornering by increasing the rotational speed difference between the two drive wheels of a drive axle.

It is also possible to improve the cross wind sensitivity of a vehicle by purposeful adjustment of a differential velocity between the two output shafts and thus between two drive wheels of a drive axle.

Alternatively to this, the torque source 28 can also be designed as a hydraulic prime mover or as any other adequate prime mover. Obviously it is also possible to provide between the torque source 28 and the bevel gear 27 of the bevel gear differential 26 one or more ratio steps in order to be able to apply as needed the purposeful torque increase or torque reduction to the operative connection 11 or to the two operatively interconnected shafts of the planetary gear sets 2 and 3, the torque source being controlled independently of the construction with added reduction steps via a control device (not shown in detail), which is integrated in a transmission control device of the transmission 1 or can be designed as a separate control device. The ratios between the individual spur gear pairs of the operative connection 11 and the two sun gears 19 and 20 being here of equal magnitude.

In a currentless state of the electric motor, the electric motor constitutes only an additional rotary mass which is operatively connected with the bevel gear 27 of the bevel gear differential 26 and which, in certain driving situations, exerts upon the operatively interconnected shafts of the planetary gear sets an action to be described below.

If the transmission 1, shown in FIG. 2, is used as axle differential for distributing the drive torque to two drive shafts of a vehicle drive axle, when unfavorable road conditions exist, this can lead to a drive wheel connected with the output shaft 7 spinning on smooth subsoil and one drive wheel connected with the output shaft 8 almost stopping due to a good ground adhesion. In this operating state of the transmission 1 there exists a high differential rotational speed between the two output shafts 7 and 8 which results in the two sun gears 19 and 20, which are stationary when the rotational speed of the two output shafts 7 ad 8 is the same, rotate with different directions of rotation. The rotary masses of the operative connection 11 and also of the currentless torque source 28 designed as an electric motor, due to their inertia counteract this rotational speed difference, specially at the beginning of the spinning of the drive wheel connected with the output shaft 7, so that part of the drive torque of the drive axle 6 is transmitted to the output shaft 8 making a start off possible.

If it is actively desired and according to a driving situation to influence under control the compensating action of the transmission 1 between the two output shafts 7 and 8, the arrangement of the operative connection 11 between the two operatively interconnected sun gears or shafts 19 and 20 of the planetary gear sets 2 and 3 with the torque source 28 is particularly adequate, since it is possible via an electric motor to receive driving on one side and, on the other, braking influence upon the differential rotational speed between the two output shafts 7, 8 of the transmission 1.

Figure 3:
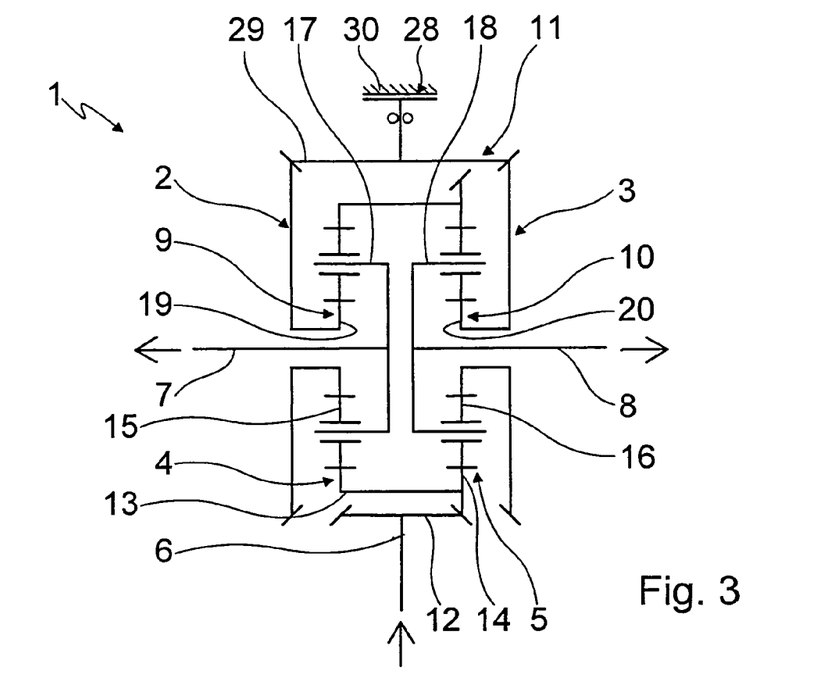
FIG. 3 is a gear diagram of an inventive transmission with ratio increase and bevel gear inversion which has one brake as torque source.

In FIG. 3 is shown another embodiment of a gear diagram of the basic diagram of the inventive transmission 1 shown in FIG. 1. The gear diagram of the transmission 1 in FIG. 3 shows an axle differential with ratio increase and a bevel gear inversion between the two sun gears 19 and 20 of the planetary gear sets 2 and 3, the operative connection 11 between both sun gears 19 and 20 being obtained via a differential bevel gear 29 and the torque source 28 connected therewith.

here the torque source 28 is designed as a brake or as a multi-disc brake and, in advantageous developments of the transmission 1, can also be a tapered brake, dog brake, fire brake or the like. Via the brake, in the same manner it is possible to continuously adjust the locking action provided in the axle differentials known in the practice for preventing a compensating action of axle differentials.

The arrangement of the torque source 28 as brake, which in closed state or during slip operation supports itself in a housing 30 of the transmission 1, in addition, offers the possibility via the present device designed as differential bevel gear 29 for rotational speed inversion between the two operatively interconnected shafts or sun gears 19 and 20, by means of the planetary gear sets 2, 3 of providing an additional "speed reducing ratio" or "speed increasing ratio" between the input shaft 6 and the output shaft 7 or the output shaft 8. Thereby a bevel gear can be practically designed, optimized in effectiveness and with reduced installation space required, such as used for standard, front, longitudinal, or rear-longitudinal drive mechanism or a spur gear ratio used, for example, in a front-transverse drive mechanism.

It is an added advantage that the torque source, both in prime mover design and in brake design, is fixedly situated to the housing in the transmission 1 and can thus be put to effect practically easier. This results from the fact that the support of the torque source in the transmission 1 can be accomplished without additional steps which require a rotary transmission of force, pressure or current.

Figure 4:
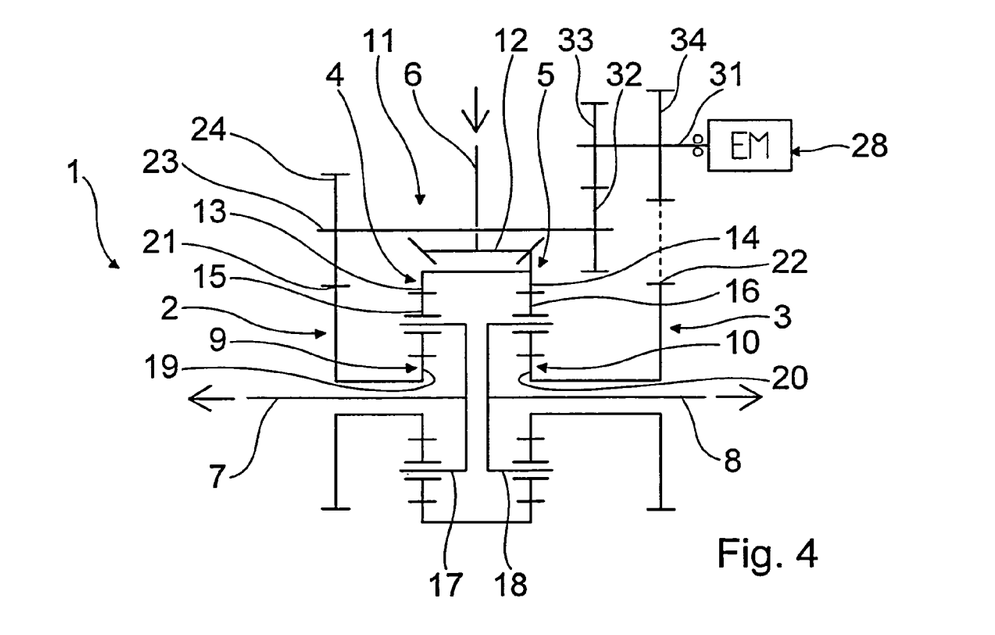
FIG. 4 is a gear diagram of another embodiment of an inventive transmission designed with a spur gear inversion.

Referring to FIG. 4, it shows a gear diagram of another embodiment of the inventive transmission 1 which is designed as axle differential with a ratio increase and a spur gear inversion as device for rotational speed inversion between the two operatively interconnected shafts or sun gears 19, 20 of the planetary gear sets 2 and 3. The operative connection 11 is here constructed with the torque source 28 designed as an electric motor which, in the extension of a second countershaft 31, is non-rotatably connected therewith.

The operative connection 11 is designed with the countershaft 23, the spur gear 24 non-rotatably connected therewith and one other spur gear 32, likewise non-rotatably connected with the countershaft 23, the last mentioned spur gear 32 meshing with a spur gear 33 of the second countershaft 31. The second countershaft 31 has one other spur gear 34 which engages in the spur gear toothing 22 of the sun gear 20 of the second planetary gear set 3 with which the operative connection 11 between the sun gear 19 of the planetary gear set 2 and the sun gear 20 of the planetary gear set 3 is created.

Like in the embodiment of the transmission 1, the torque source 28, according to the direction of rotation, acts upon the two sun gears 19 and 20 as a motor via the second countershaft 31 or as a generator via the operative connection 11. In the operation as motor of the torque source 28 an increase of the differential rotational speed between the two sun gears 19 and 20 of the transmission 1 is obtained while, in the operation range as generator, the torque source 28 acts as brake and a differential rotational speed is reduced between the two output shafts 7 and 8.

If the electric motor is operated as a motor, a differential rotational speed between the two output shafts 7 and 8 can be purposefully increased in relation to a differential rotational speed appearing as a result of the different curve radii on the drive wheel inside the curve and on the drive wheel outside the curve, in the sense that the vehicle has a strong tendency to cornering whereby a considerably better driving behavior of the vehicle is obtained.

Figure 5:
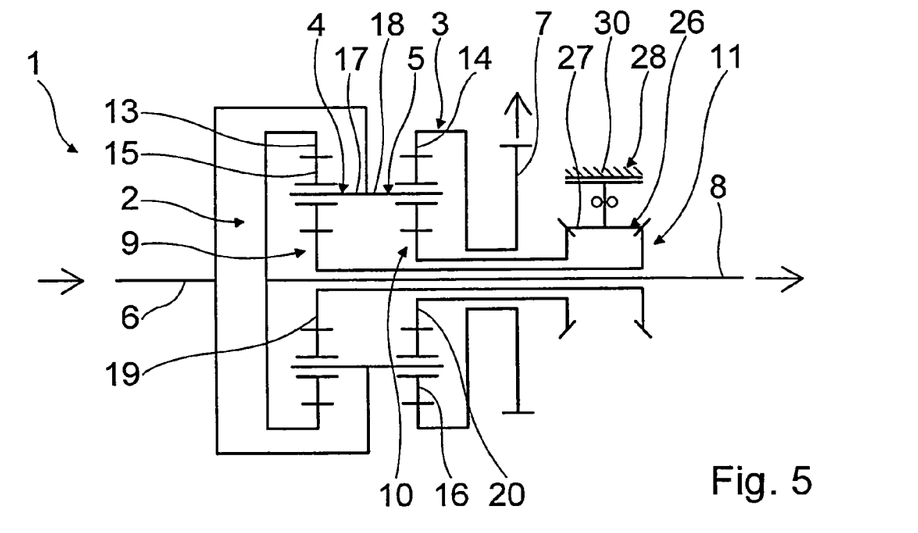
FIG. 5 is a gear diagram of an inventive transmission designed as four-wheel distributor transmission with ratio reduction and bevel gear inversion.

FIG. 5 shows a gear diagram of the inventive transmission 1 which is designed as a four-wheel distributor transmission with ratio reduction and bevel gear inversion between the two operatively interconnected shafts of the planetary gear sets 2 and 3. The operative connection 11 between the two operatively interconnected shafts or sun gears 19 and 20 of the planetary gear sets 2 and 3 is provided with one torque source 28 designed as brake which is non-rotatably connected with the bevel gear 27 of the bevel gear differential 26 and is supported on the side of the housing.

The output shafts 7 and 8 are connected here with the ring gears 13 and 14 of the planetary gear sets 2 and 3 and the drive torque of the input shaft 6 is introduced via the interconnected webs 17 and 18 in the planetary gear sets 2 and 3.

Figure 6:
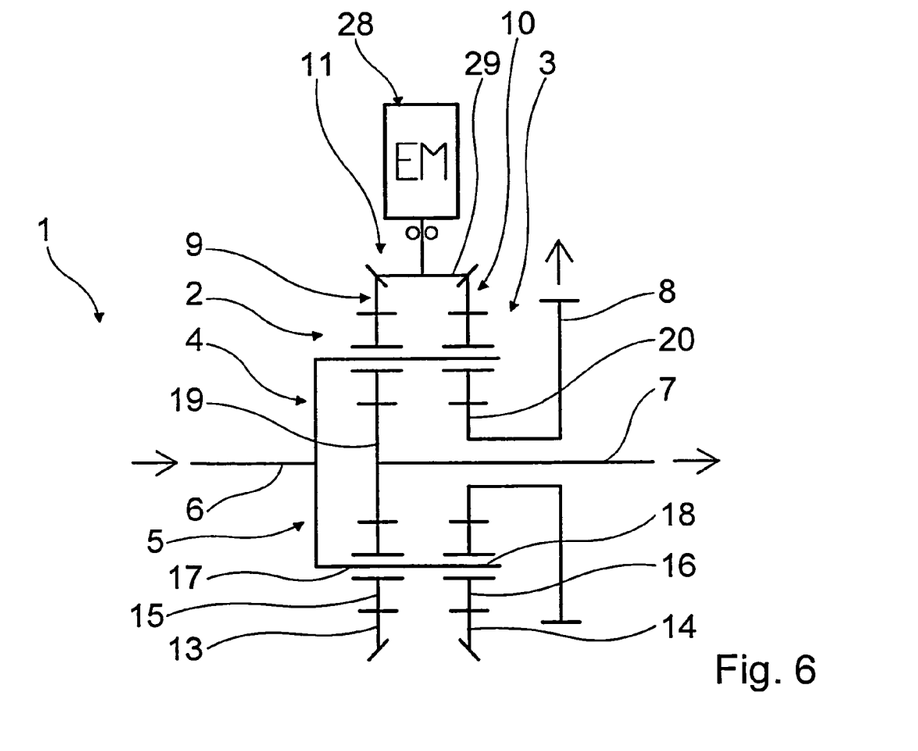
FIG. 6 is another embodiment of an inventive transmission designed as four-wheel distributor transmission with ratio reduction and bevel gear inversion and provided with an electric motor as torque source.

FIG. 6 shows another embodiment of an inventive transmission 1 designed as four-wheel distributor transmission with ratio reduction and bevel gear inversion in which the two ring gears 13 and 14 of the two planetary gear sets 2 and 3 constitute the two shafts 9 and 19, operatively interconnected via the operative connection 11, of the planetary gear sets 2 and 3.

Between the two ring gears 13 and 14 the differential bevel gear 29 is provided as device for rotational speed inversion and is connected with the torque source 28 designed as electric motor.

Figure 7:
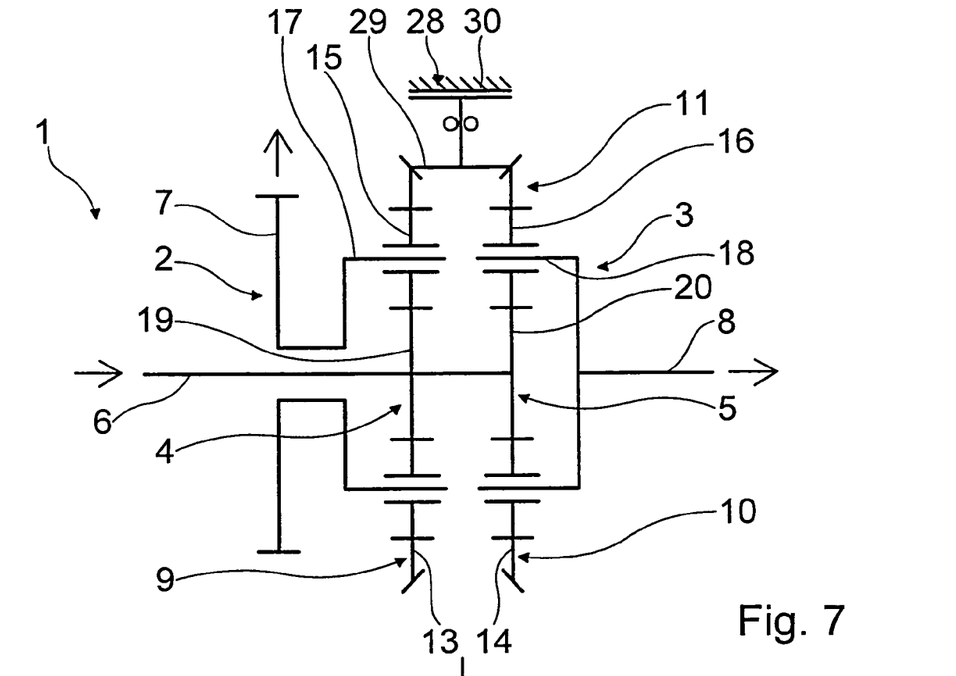
FIG. 7 is an inventive four-wheel distributor transmission with ratio increase and bevel gear inversion which has one brake as torque source.

In the gear diagram of the transmission 1 shown in FIG. 7, the drive torque is introduced departing from the input shaft 6 to the interconnected sun gears 19 and 20 of the two planetary gear sets 2, 3. The output shafts 7 and 8 of the transmission 1 are connected with the webs 17 and 18 of both planetary gear sets 2 and 3. Between the two ring gears 13 and 14 or between the two operatively interconnected shafts 9 and 10 of both planetary gear sets 2 and 3, the differential bevel gear 29 is in turn provided as device for rotational speed inversion, the differential bevel gear 29 of the operative connection 11 being designed with a brake as torque source 28 supportable on the housing side.

Figure 8:
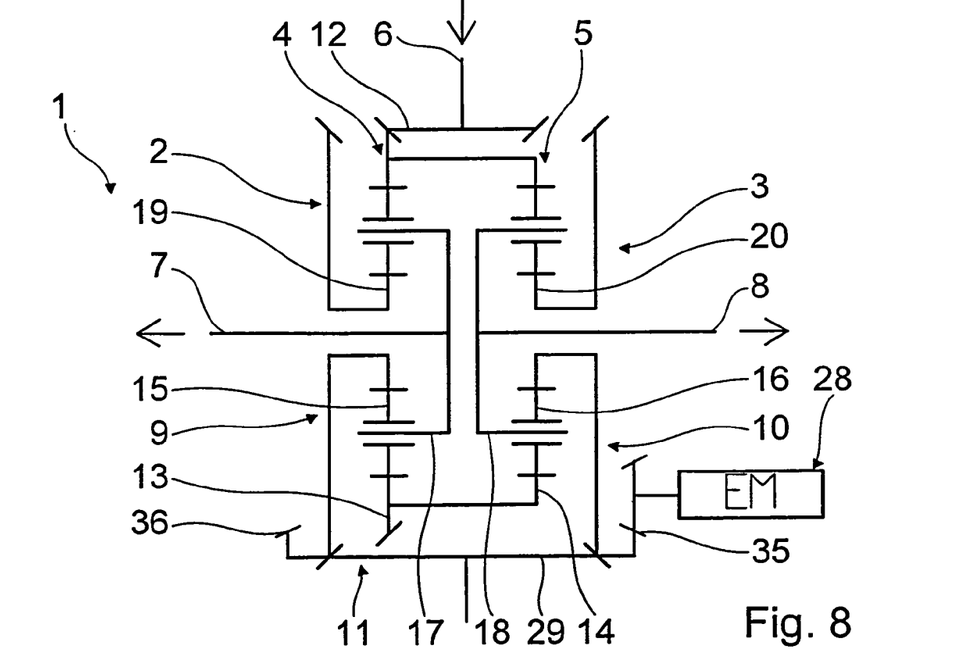
FIG. 8 is the inventive transmission according to FIG. 3 wherein the torque source is designed as electric motor paraxial with the output axles.
Figure 9:
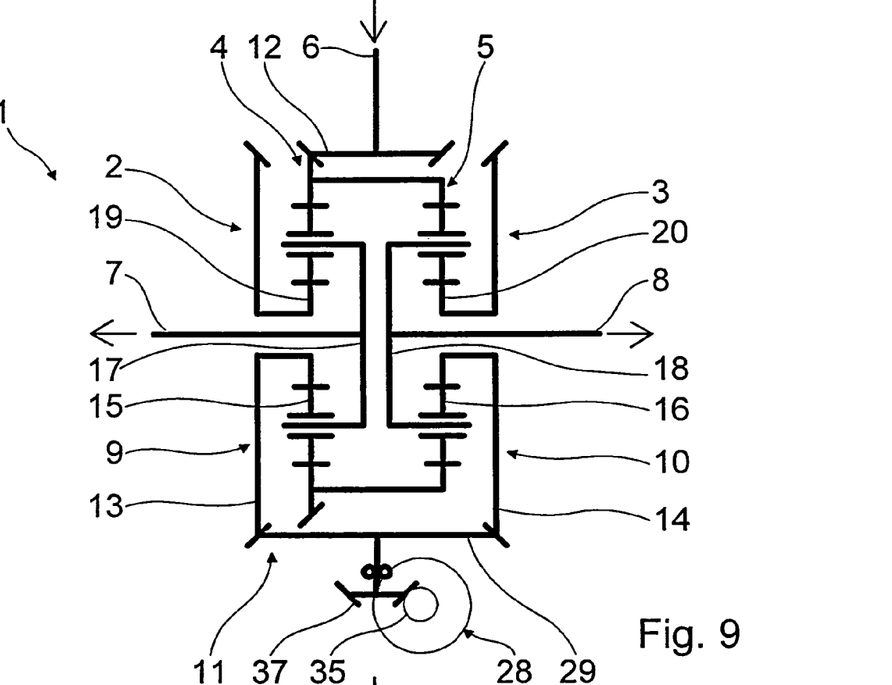
FIG. 9 is the transmission according to FIG. 8 wherein the electric motor is disposed perpendicular to the output axles.
Figure 10:
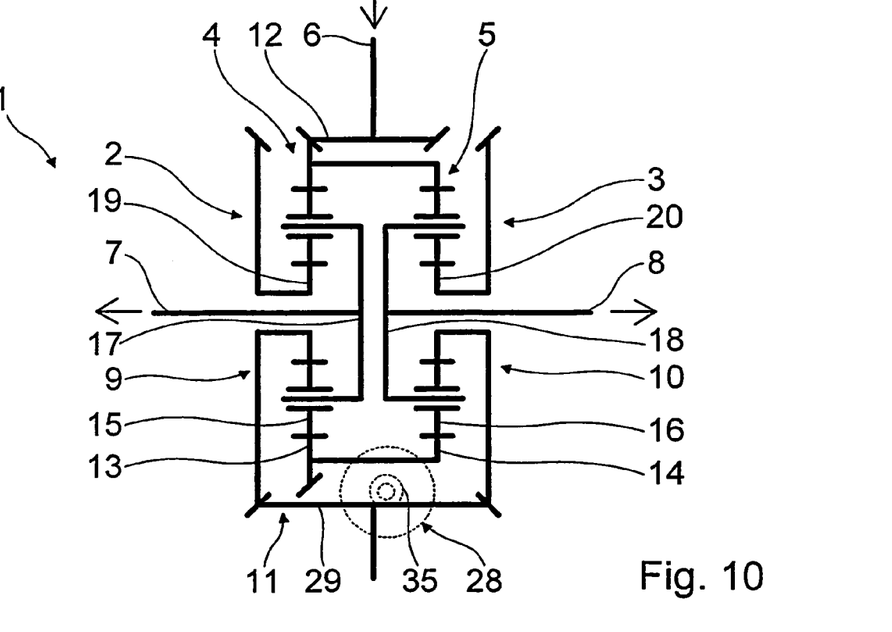
FIG. 10 is a gear diagram according to FIG. 8 and FIG. 9 wherein a toothing of an electric motor engages directly in a toothing of a differential bevel gear.

In FIG. 8 to FIG. 10 is shown in each one gear diagram according to FIG. 3 wherein the torque source 28 designed as electric motor is positioned in different arrangements relative to the output axles 7 and 8.

In the embodiment of the transmission 1, according to FIG. 8, the torque source or electric motor 28 is disposed paraxially with the output shafts 7 and 8 and one input shaft 6 of the electric motor is designed with a crown toothing 35 or a bevel gear which meshes with a crown toothing 36 of the differential bevel gear 29. The differential bevel gear 29, in addition, constitutes the device for rotational speed inversion between the two shafts or sun gears 19 and 20 of the two planetary gear sets 2 and 3 which are operatively interconnected via the operative connection 11.

The arrangement of the electric motor 28 according to FIG. 8 offers, in comparison with the arrangement thereof according to FIG. 3, the possibility of arranging the outer dimensions of the transmission 1 so that the transmission 1 according to FIG. 8, is designed wider and shorter than the transmission 1 according to FIG. 3. The connection of the electric motor 28 with the differential bevel gear 29 via the crown toothing 35 of the input shaft 6 of the electric motor 28 and of the crown toothing 36 of the differential bevel gear 29 additionally offers the possibility of providing, between the electric motor 28 and the two operatively interconnected shafts 9 and 10, a ratio which when adequately laid out reduces the required input of the electric motor 28. This possibility obviously also exists in the embodiment of the transmission 1, according to FIG. 3, where an adequate ratio can be integrated as needed into the diagrammatically shown housing of the electric motor 28.

Referring to FIG. 9, the electric motor 28 is disposed perpendicular to the output shafts 7 and 8 and engages, via a bevel toothing 37, directly in the differential bevel gear 29. This arrangement, in turn, results in a reduction of the diameter of the differential bevel gear 29 in comparison to the embodiment according to FIG. 8 where the crown toothing 36 produces an enlargement of the diameter of the differential bevel gear 29. Compared to FIG. 3, the transmission in the embodiment of FIG. 9 is shorter and designed thinner compared to the embodiment of FIG. 8.

In relation to FIG. 8 and FIG. 9, FIG. 10 represents another alternative development of an inventive transmission 1 wherein the torque source 28 designed as an electric motor is disposed perpendicular to the output shafts 7 and 8 and engages, via a bevel gear or the crown toothing 35, directly in the toothing of the differential bevel gear 29 which simultaneously meshes with both sun gears 19 and 20 of the planetary gear sets 2 and 3.

The embodiment of the transmission 1, according to FIG. 10 compared to the embodiment of FIG. 9, is characterized by being shorter and, having compared to the embodiment of the FIG. 8, less width whereby the space needed for the transmission is reduced.

Alternatively to this, the electric motor or the torque source can obviously be located also in any other angle formed with the two output axles 7 and 8 and the toothing between the electric motor and the differential bevel gear can also be formed, for example, by a worm toothing.

In FIG. 11 to FIG. 16 are shown several gear diagrams of an inventive transmission which are essentially based on the gear diagram shown in FIG. 4 and constitute advantageous developments. In the description that follows of said developments, reference is made only to the differences from the design of the transmission 1 according to FIG. 4.

Figure 11:
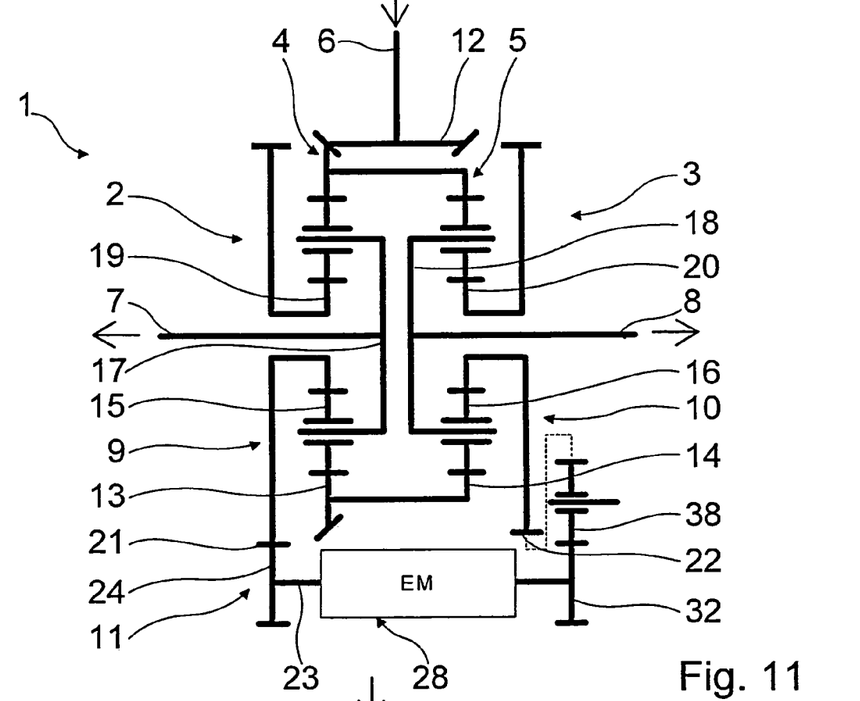
FIG. 11 is a gear diagram according to FIG. 4 wherein an electric motor is disposed paraxially with the output axles and directly upon a countershaft of the operative connection.

In the gear diagram of the transmission 1 shown in FIG. 11 the torque source 28 is designed as electric motor which is situated directly upon the countershaft 23 between the two spur gears 24 and 32. Between the spur gear 32 and the sun gear 20 of the planetary gear set 3, an intermediate spur gear 38 is provided for rotational speed inversion. A dotted line between the intermediate spur gear 38 and the spur gear toothing 22 serves only to make clear that the intermediate gear 38 meshes directly with the spur gear toothing 22 of the sun gear 20. The space shown in the drawing plane between the intermediate gear 38 and the spur gear toothing 22 results from the fact that the intermediate gear is tilted in the drawing plane for a better representation.

The arrangement of the electric motor between the spur gears 24 and 32 directly upon the countershaft 23 easily leads to a simple integration of the electric motor in the housing of the transmission 1 and, compared to the developments of the transmission 1 in which the electric motor is located outside the housing, to a reduction of the outer dimensions of the transmission in assembled state whereby, in turn, a reduction of the space required for the transmission is achieved.

Figure 12:
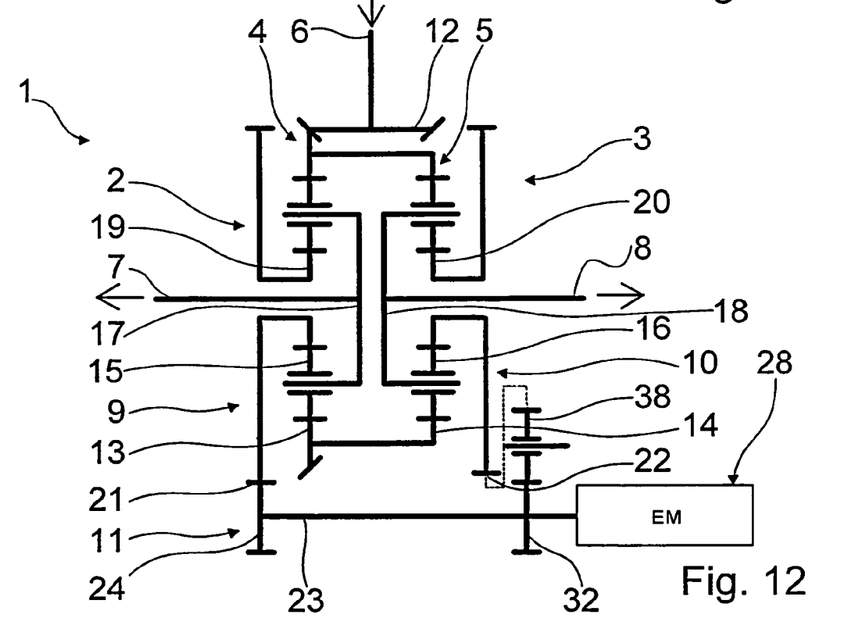
FIG. 12 is a gear diagram according to FIG. 11 wherein the electric motor is disposed in extension of the countershaft.

If the torque source or the electric motor 28, due to its required input and to the outer dimensions resulting therefrom, cannot be positioned in the way shown directly upon the countershaft 23,;it is possible to couple the electric motor 28 in the manner shown in FIG. 12 on the countershaft 23 by an extension on the countershaft 23.

Figure 13:
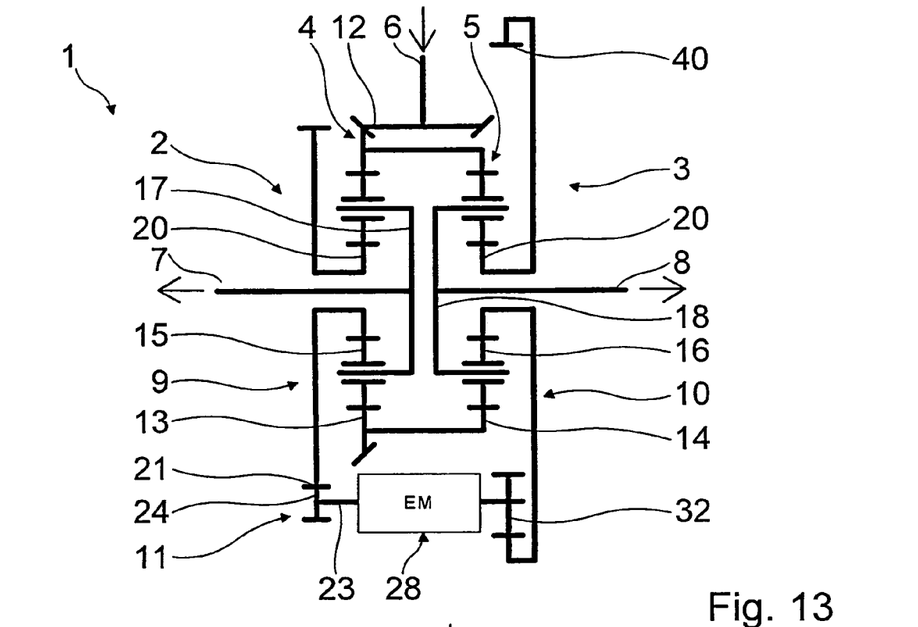
FIG. 13 is a gear diagram according to FIG. 11 and FIG. 12 wherein a rotational speed inversion between the countershaft and one of the operatively interconnected shafts of the planetary gear sets is effected by a spur gear and a ring gear.

FIG. 13 shows another development of the device for rotational speed inversion of the operative connection 11 alternative to the transmission 1 of FIG. 11. The spur gear 32 here meshes for rotational speed inversion with a ring gear 40 connected with the sun gear 20 and the electric motor, in turn, is situated directly upon the countershaft 23 between the spur gears 24 and 32.

Figure 14:
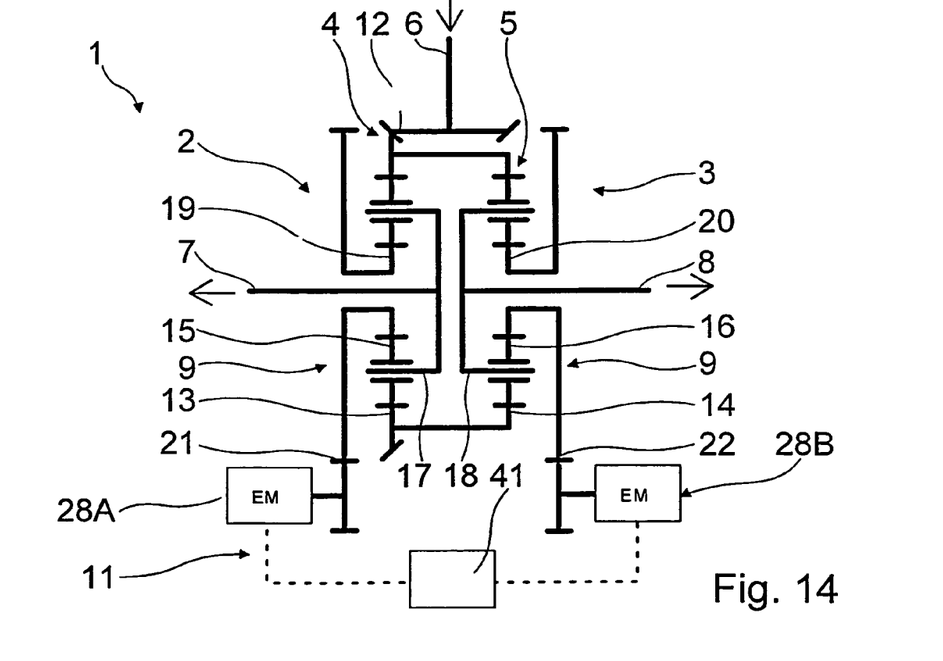
FIG. 14 is a gear diagram according to FIG. 11 to FIG. 13 wherein the operative connection between the two operatively interconnected shafts of the planetary gear sets is made by two electric motors started via a common control device.

In the transmission 1 according to FIG. 14, the operative connection 11 between the two operatively interconnected shafts 9 and 10 or the sun gears 19 and 20 of the planetary gear sets 2 and 3, compared to the embodiments of the transmission 1 shown in FIGS. 1 to 13, is not made by one or more toothed wheel pairs. The operative connection 11 is effected by two operatively interconnected shafts 9 and 10, that is, separate torque sources 28A and 28B are here associated with the sun gears 19 or 20, and via an electric control device 41 are interconnected according to control and regulation technology.

This means that the operative connection 11 between the two operatively interconnected shafts 9 and 10 is designed as electric connection which, via an adequate control and/or regulation of the two torque sources 28A and 28B, designed here as electric motor, can be loaded with a torque so that the transmission 1 of FIG. 14 can be operated in the same specified manner as the designs of the transmission 1 according to FIG. 1 to FIG. 13. The device for rotational speed inversion between the two operatively interconnected shafts 9 and 10 of the planetary gear sets 2 and 3 is implemented here, via an adequate control of both torque sources 28A and 28B.

Figure 15:
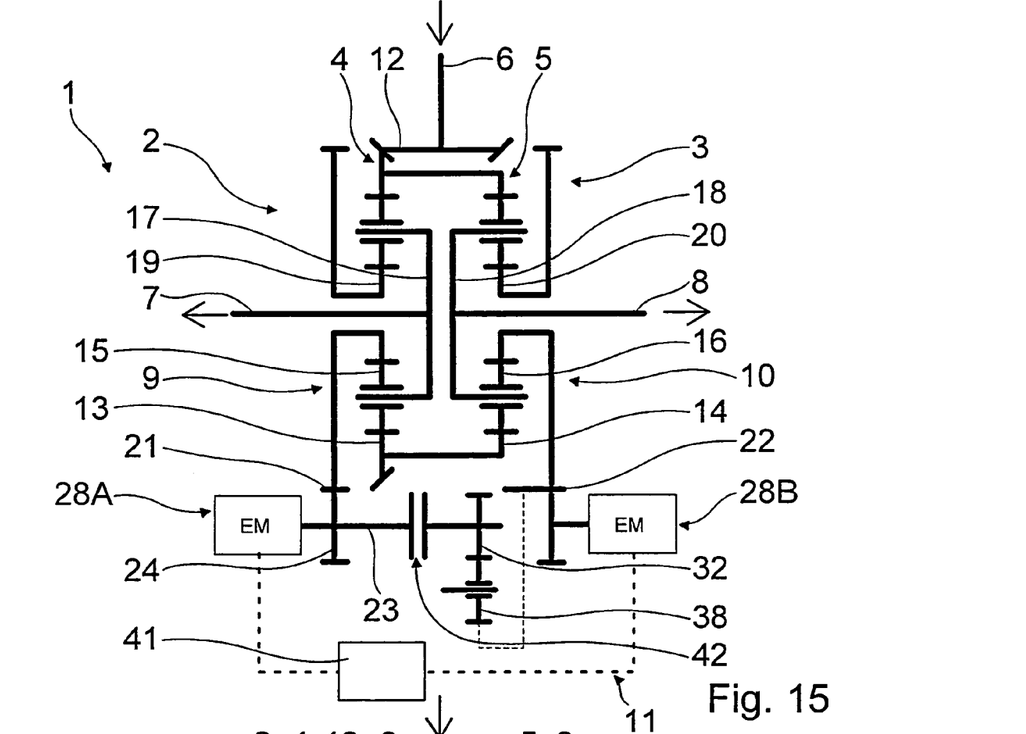
FIG. 15 is a development of the transmission according to FIG. 4 wherein one clutch is provided between the two operatively interconnected shafts.

In order that the operative connection, between the two operatively interconnected shafts of the planetary gear sets 2 and 3, is also available in case of slippage of an electric circuit of a vehicle, it is provided in the embodiment of the transmission 1 shown in FIG. 15 to supply, between the two operatively interconnected shafts 9 and 10, the countershaft 23 with the spur gears 24 and 32, the same as the intermediate spur gear 38. But the countershaft 23 is designed in two parts provided in the separation with a clutch 42 which is closed when no current is supplied and both parts of the countershaft 23 are fixedly connected with each other. In this operating state of the clutch 42, according to FIG. 15, the transmission 1 represents an open differential transmission which, due to the mass inertias of the parts of the operating connection 11, lessens with certainty a compensating action of the transmission 1 at differential rotational speeds between the output shafts 7 and 8.

Figure 16:
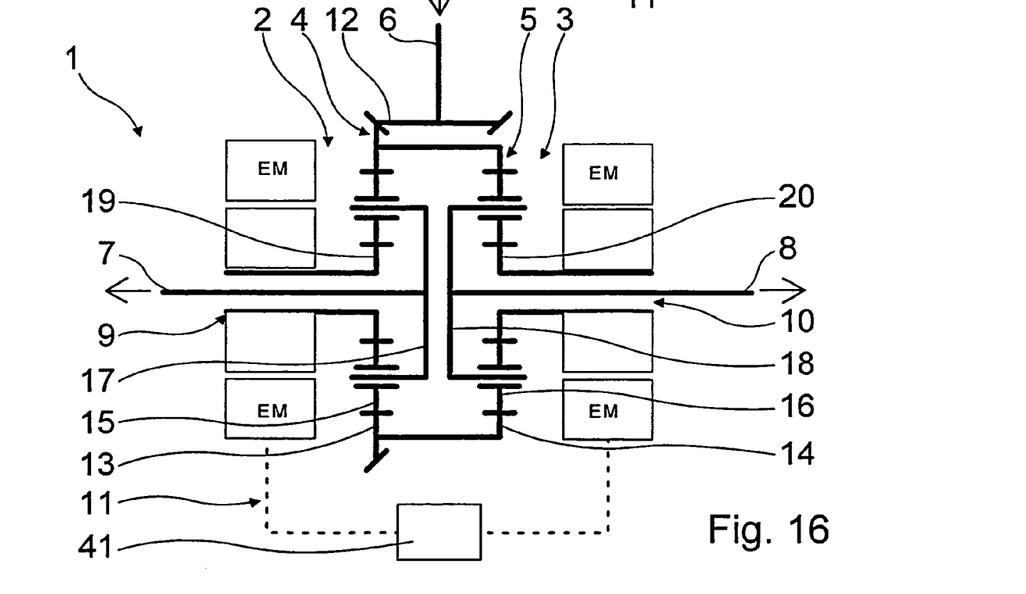
FIG. 16 is a gear diagram according to FIG. 14 wherein the two electric motors are disposed coaxially with the two shafts operatively connected via the electric motors.

One other fundamental arrangement of the two torque sources 28A and 28B is shown in FIG. 16 where the torque sources designed as electric motors are disposed coaxially around the sun gears 19 and 20 which constitute the operatively interconnected shafts 9 and 10 of the planetary gear sets 2 and 3.

Figure 17:
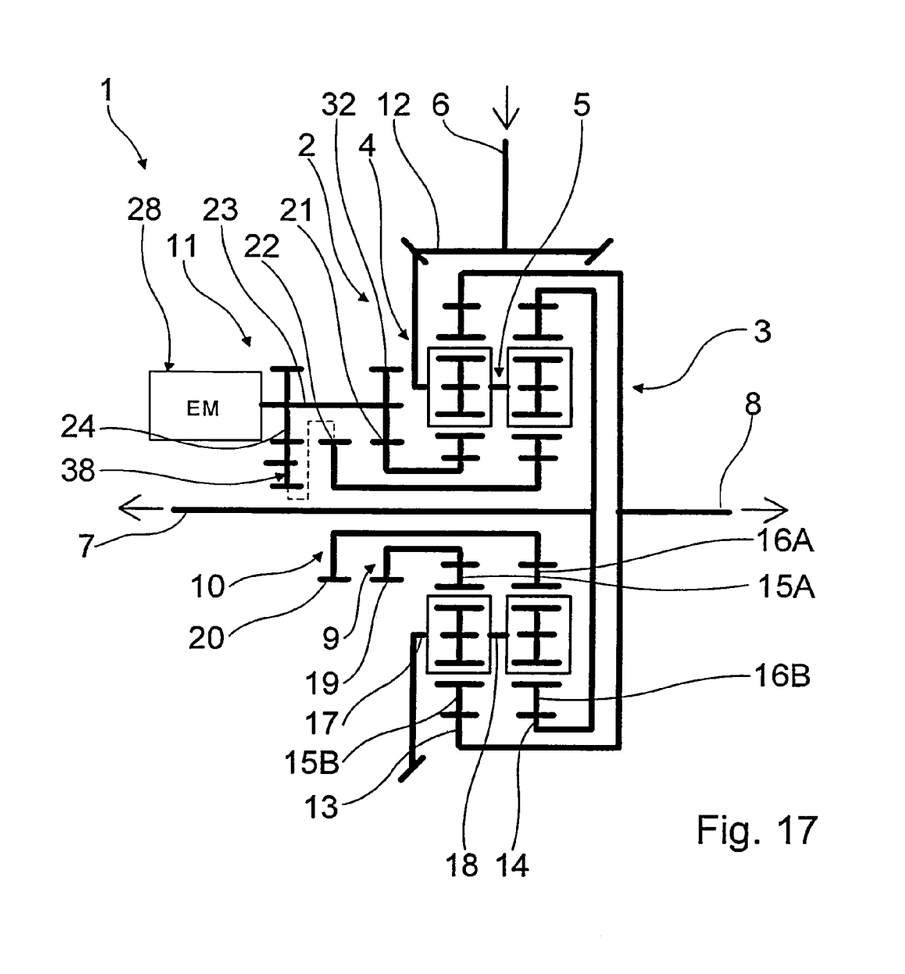
FIG. 17 is another embodiment of an inventive transmission wherein the two planetary gear sets form one positive planetary gear set.

Referring to FIG. 17, it shows another embodiment of the inventive transmission 1 in which the two planetary gear sets 2 and 3 are combined to form a so-called positive planetary gear set. Both planetary gear sets 2 and 3 have each a double planetary gear set with an inner planetary gear 15A or 16A and an outer planetary gear 15B or 16B. The inner planetary gear 15A or 16A of one of each double planetary gear set meshes simultaneously with the sun gear 19 or 20 and the outer planetary gear 15B or 16B. The outer planetary gears 15B and 16B mesh each with respective inner planetary gears 15A and 16A, the same as the ring gear 13 or 14.

The drive torque of the input shaft 6 is transmitted via the first bevel gear 12 to the interconnected webs 17 and 18 of the planetary gear sets 2 and 3 and transmitted via the inner planetary gears 15A, 16A and the outer planetary gears 15B and 16B, respectively, to the two ring gears 13 and 14. The ring gears 13 and 14 are respectively connected with the output shafts 7 and 8 which, in turn, are each connected with one drive wheel of a vehicle transmission axle.

The two sun gears 19 and 20 constitute here the operatively interconnected shafts 9 and 10 of the planetary gear sets 2 and 3, the operative connection 11 between the two sun gears 19 and 20 being made via the countershaft 23 and one spur gear inversion between the countershaft 23 and the sun gear 20. The torque source 28 engages in an extension of the countershaft 23 outside the two spur gears 24 and 32 on the countershaft 23.

Differing from the embodiments of the inventive transmission shown in the drawing, it can also be provided that the operative connection between the two operatively interconnected shafts of the planetary gear sets be designed with at least one brake and additionally one prime mover, such as an electric motor or a hydraulic motor, to actively make it possible to control a rotational speed difference between the two output shafts of the transmission or of the planetary gear sets.

It can additionally be provided in another development of the inventive transmission that the operative connection be connected with a rotary mass or a rotary part provided alternatively to the electric motor or the brake or also in combination to the electric motor and/or the brake. Due to its mass moment of inertia, said rotary part or said rotary mass of the operative connection causes to be lessened or minimized differential rotational speeds appearing between the two output shafts of the planetary gear sets in case of sudden rotational speed changes of the two output shafts of the planetary gear set.

This constitutes a so-called acceleration-sensitive system, the use of which makes it unnecessary to determine differential speeds such as is the case, for example, in viscous clutches or locking differentials, or to determine differential torques as in so-called Torsen differentials. In the instant system are automatically generated, according to differential accelerations between the two output shafts of the planetary gear sets, system-dependent control torques which are applied via the operative connection to the two operatively interconnected shafts of the planetary gear sets.

To make it possible to minimize the rotary mass or the mass of the rotary part of the operative connection, it is provided in another advantageous design of the inventive transmission that the rotary mass or the rotary part be coupled on the operative connection via a ratio to "quick" since the mass inertia of the rotary part of the rotary mass is increased to second power and thus the effect obtained in the same as with a larger mass.

By the expression rotary mass of the operative connection is preferably to be understood here all masses of the parts of the operative connection, that is for example, the countershafts or the differential bevel gears, the spur gear toothings of the operative connection and the masses of the torque source, such as of an electric motor, a brake or the like. In addition, the mass of the operative connection, as previously described, can also be implemented as an additional part coupled on the two operatively interconnected shafts of the planetary gear sets.

REFERENCE NUMERALS 1 transmission
2 planetary gear set
3 planetary gear set
4 first shaft of the planetary gear set 2
5 first shaft of the planetary gear set 3
6 input shaft
7 output shaft, second shaft of the planetary gear set 2
8 output shaft, second shaft of the planetary gear set 3
9 third shaft of the planetary gear set 2
10 third shaft of the planetary gear set 3
11 operative connection
12 first bevel gear
13 ring gear of the planetary gear set 2
14 ring gear of the planetary gear set 3
15 planetary gear of the planetary gear set 2
15A, 16A inner planetary gear gear
15B, 16B outer planetary gear
16 planetary gear of the planetary gear set 3
17 web of the planetary gear set 2
18 web of the planetary gear set 3
19 sun gear of the planetary gear set 2
20 sun gear of the planetary gear set 3
21 spur gear toothing of the planetary gear set 2
22 spur gear toothing of the planetary gear set 3
23 countershaft
24 spur gear of the countershaft 23
25 spur gear of the countershaft 23
26 bevel gear differential
27 bevel gear of the bevel gear differential 26
28 torque source or electric motor
28A, 28B torque source
29 differential bevel gear
30 housing
31 second countershaft
32 spur gear of the countershaft 23
33 spur gear of the second countershaft 31
34 spur gear of the second countershaft 31
35 crown toothing of the torque source
36 crown toothing of the differential bevel gear 29
37 bevel toothing
38 intermediate gear
40 ring gear to the sun gear of the planetary gear set 3
41 electric control device
42 coupling or clutch

The invention claimed is:

1. A transmission (1) for distributing drive torque to at least two output shafts (7, 8), the transmission (1) having at least first and second planetary gear sets (2, 3) which each have at least three shafts;
    wherein a first shaft (4 or 5) of each of the planetary gear sets (2, 3) is connected with an input shaft (6);
    a second shaft (7 or 8) of each of the planetary gear sets (2, 3) comprises an output shaft;
    a third shaft (9 or 10) of one of the first and second planetary gear sets (2 or 3) is operative connected, via an operative connection (11), with a third shaft (9 or 10) of the other of the first and the second planetary gear sets (3 or 2) so that when a rotational speed difference occurs between the two output shafts (7, 8), a corresponding torque resulting from the speed difference is transmitted between the first and the second planetary gear sets (2, 3) through the operative connection (11) to change the rotational speed difference;
    the operative connection (11) has a device for rotational speed inversion between the operatively connected shafts (9, 10); and
    the device for rotational speed inversion has a ring gear (40) and a spur gear (32) meshing with the ring gear (40).

2. The transmission according to claim 1, wherein the device for rotational speed inversion has one bevel gear (29) which simultaneously is connected with both of the operatively connected shafts (9,10).

3. The transmission according to claim 1, wherein the device for rotational speed inversion has one spur gear step (24, 32) and one intermediate gear (38).

4. The transmission according to claim 1 wherein the operative connection (11) has one ratio device.

5. The transmission according to claim 1 wherein the operative connection (11) has at least one device (28) for applying torque to at least one of the two operatively interconnected shafts (9, 10) of the planetary gear sets (2, 3) so that torque is applied to each of the operatively connected shafts (9, 10).

6. The transmission according to claim 5, wherein the device (28) for applying torque has at least one prime mover.

7. The transmission according to claim 6 wherein the prime mover has one of an electric motor or a hydraulic motor.

8. The transmission according to claim 5 wherein the device (28) for applying a torque has at least one brake.

9. The transmission according to claim 1 wherein said operative connection (11) has one clutch (42).

10. A transmission (1) for distributing drive torque to at least two output shafts (7, 8), the transmission (1) having at least first and second planetary gear sets (2, 3) which each have at least three shafts;
    wherein a first shaft (4 or 5) of each of the planetary gear sets (2, 3) is connected with an input shaft (6);
    a second shaft (7 or 8) of each of the planetary gear sets (2, 3) comprises an output shaft;
    a third shaft (9 or 10) of one of the first and second planetary gear sets (2 or 3) is operative connected, via an operative connection (11), with a third shaft (9 or 10) of the other of the first and the second planetary gear sets (3 or 2) so that when a rotational speed difference occurs between the two output shafts (7, 8), a corresponding torque resulting from the speed difference is transmitted between the first and the second planetary gear sets (2, 3) through the operative connection (11) to change the rotational speed difference;
    the operative connection (11) has a device for rotational speed inversion between the operatively connected shafts (9, 10); and
    at least one of the operatively connected shafts of the first and the second planetary gear sets is connected with one rotary part via a ratio device which ratio device of the first and the second planetary gear sets is a part with such a desired ratio that spontaneous rotational speed changes of the output shafts, which lead to a differential speed between the operatively connected shafts, are lessened by the part.

* * * * *